United States Patent
Otanez et al.

(10) Patent No.: US 9,052,014 B2
(45) Date of Patent: Jun. 9, 2015

(54) SYSTEM AND METHOD FOR ACCUMULATOR FLUID MIXING

(75) Inventors: Paul G. Otanez, Troy, MI (US); Zhen J. Zhang, Canton, MI (US); Casie M. Bockenstette, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 538 days.

(21) Appl. No.: 13/442,415

(22) Filed: Apr. 9, 2012

(65) Prior Publication Data

US 2013/0263584 A1 Oct. 10, 2013

(51) Int. Cl.
*F16H 61/4096* (2010.01)
*F15B 1/02* (2006.01)
*F16H 61/00* (2006.01)

(52) U.S. Cl.
CPC ...... *F16H 61/4096* (2013.01); *B60W 2510/107* (2013.01); *F16H 2061/0034* (2013.01); *F15B 1/024* (2013.01); *F15B 2201/50* (2013.01); *F15B 2201/51* (2013.01); *F15B 2211/212* (2013.01); *F15B 2211/6306* (2013.01); *F15B 2211/6343* (2013.01)

(58) Field of Classification Search
CPC ............... F16H 61/4096; F16H 2061/0034; F15B 1/024
USPC ........................ 60/329, 418; 701/51
See application file for complete search history.

(56) References Cited

U.S. PATENT DOCUMENTS

| | | | |
|---|---|---|---|
| 4,995,241 A * | 2/1991 | Vandervaart ................ | 62/238.7 |
| 5,201,862 A * | 4/1993 | Pettitt ........................ | 62/157 |
| 6,074,320 A | 6/2000 | Miyata et al. | |
| 8,585,548 B2 * | 11/2013 | Zhang et al. .................. | 477/110 |
| 8,591,381 B2 * | 11/2013 | Zhang et al. .................. | 477/150 |
| 8,639,424 B2 * | 1/2014 | Lundberg et al. ............... | 701/54 |
| 8,702,562 B2 * | 4/2014 | Zhang et al. .................. | 477/52 |
| 8,863,508 B2 * | 10/2014 | Nelson et al. ................... | 60/418 |
| 2007/0216222 A1 * | 9/2007 | Miyazaki et al. ............ | 303/155 |
| 2008/0060862 A1 | 3/2008 | Schiele et al. | |
| 2010/0282020 A1 | 11/2010 | Greenwood et al. | |
| 2011/0011074 A1 * | 1/2011 | Mellet et al. .................... | 60/329 |
| 2011/0139285 A1 | 6/2011 | Lundberg et al. | |

FOREIGN PATENT DOCUMENTS

DE 102006041899 A1 3/2008
WO WO2007118500 A1 10/2007

OTHER PUBLICATIONS

U.S. Appl. No. 13/228,275, filed Sep. 8, 2011, by Zhang et al. All pages.
U.S. Appl. No. 13/228,658, filed Sep. 9, 2011, by Zhang et al. All pages.
U.S. Appl. No. 13/228,664, filed Sep. 9, 2011, by Zhang et al. All pages.
U.S. Appl. No. 13/288,666, filed Nov. 3, 2011, by Lundberg et al. All pages.
U.S. Appl. No. 13/315,059, filed Dec. 8, 2011, by Otanez et al. All pages.

* cited by examiner

*Primary Examiner* — Thomas E Lazo

(57) ABSTRACT

A system and method for controlling an accumulator for use with a hydraulic circuit is provided. The system and method is configured to determine a set of accumulator temperature indicators and discharge and charge the accumulator as a function of the set of accumulator temperature indicators.

19 Claims, 2 Drawing Sheets

SYSTEM AND METHOD FOR ACCUMULATOR FLUID MIXING

FIELD

The present disclosure relates to a system and method for controlling an accumulator of a vehicle system, and more particularly to a system and method for controlling an accumulator to mix accumulator fluid with system fluid.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, certain conditions can inhibit the start/stop of the engine. For example, the hydraulic fluid within the accumulator may have a lower temperature than the hydraulic fluid within the transmission when ambient temperatures are relatively low, because the accumulator is typically located outside of the transmission. If the hydraulic fluid within the accumulator is too far below the temperature of hydraulic fluid within the transmission, the engine start/stop may be prevented from occurring, or if the start/stop occurs, the transmission performance may not be optimal.

Therefore, there is a need in the art for a system and method for controlling the temperature of hydraulic fluid located within the accumulator to enable proper use of engine start/stop techniques.

SUMMARY

The present disclosure provides a system and method for controlling accumulator fluid that includes discharging/charging the accumulator to mix the hydraulic fluid located in the accumulator with the hydraulic fluid in the transmission (or other hydraulic system component). The system and method includes determining when to mix the fluid as a function of accumulator temperature indicators, such as, for example, air temperature, transmission fluid temperature (current as well as at last charging time), and time since last discharge/charge.

In one variation, a method for controlling an accumulator for use with a hydraulic circuit is provided. The method includes determining a set of accumulator temperature indicators and discharging the accumulator as a function of the set of accumulator temperature indicators. The method further includes charging the accumulator after discharging the accumulator. The accumulator temperature indicators may include but are not limited to the following: length of time since the most recent charge or discharge of the accumulator at a charging time, ambient temperature of adjacent air, charging temperature of hydraulic fluid within another component at the charging time, such as a transmission, and/or current temperature of hydraulic fluid within the transmission or other component at a current time.

In one variation, which may be combined with or separate from the previous variation, a method for controlling an accumulator of a powertrain, having an engine and/or electric motor and a transmission, in a motor vehicle is provided. The method includes determining a length of time since a most recent charge or discharge of the accumulator at a charging time, sensing an ambient air temperature adjacent to the powertrain of the motor vehicle, determining a charging temperature of charging time automatic transmission fluid located within the transmission at the charging time, and sensing a current temperature of current time automatic transmission fluid located within the transmission at a current time. The method further includes determining a theoretical temperature variation index between automatic transmission fluid located within the transmission and automatic transmission fluid located within the accumulator, wherein determining the theoretical temperature variation index is based on the ambient air temperature, the length of time since the most recent charge or discharge of the accumulator at the charging time, the charging temperature of the charging time automatic transmission fluid, and the current temperature of the current time automatic transmission fluid. The method includes discharging the accumulator if the theoretical temperature variation index exceeds a predetermined threshold. The method also includes charging the accumulator after discharging the accumulator.

In another variation, which may be combined with or separate from the other variations described herein, a powertrain system of a motor vehicle is provided. The powertrain system includes a transmission, an engine and/or electric motor, a hydraulic circuit, an accumulator, and a control module. The transmission has at least one torque transmitting device. The engine is operable to supply torque to the transmission. The hydraulic circuit is in fluid communication with the transmission and contains hydraulic fluid. The accumulator is in fluid communication with the hydraulic circuit and the transmission, and the accumulator is configured to provide a compressive force on the hydraulic fluid. The control module is in communication with the transmission and is configured to execute at least first, second, and third control logics. The control module is configured to execute the first control logic to determine a set of accumulator temperature indicators, including determining an adjacent ambient air temperature. The control module is configured to execute the second control logic to make a discharge determination. The discharge determination is selected from a decision to discharge the accumulator and a decision not to discharge the accumulator. The discharge determination is based on the set of accumulator temperature indicators. The control module is configured to execute the third control logic to discharge the accumulator if the discharge determination is selected as the decision to discharge the accumulator.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
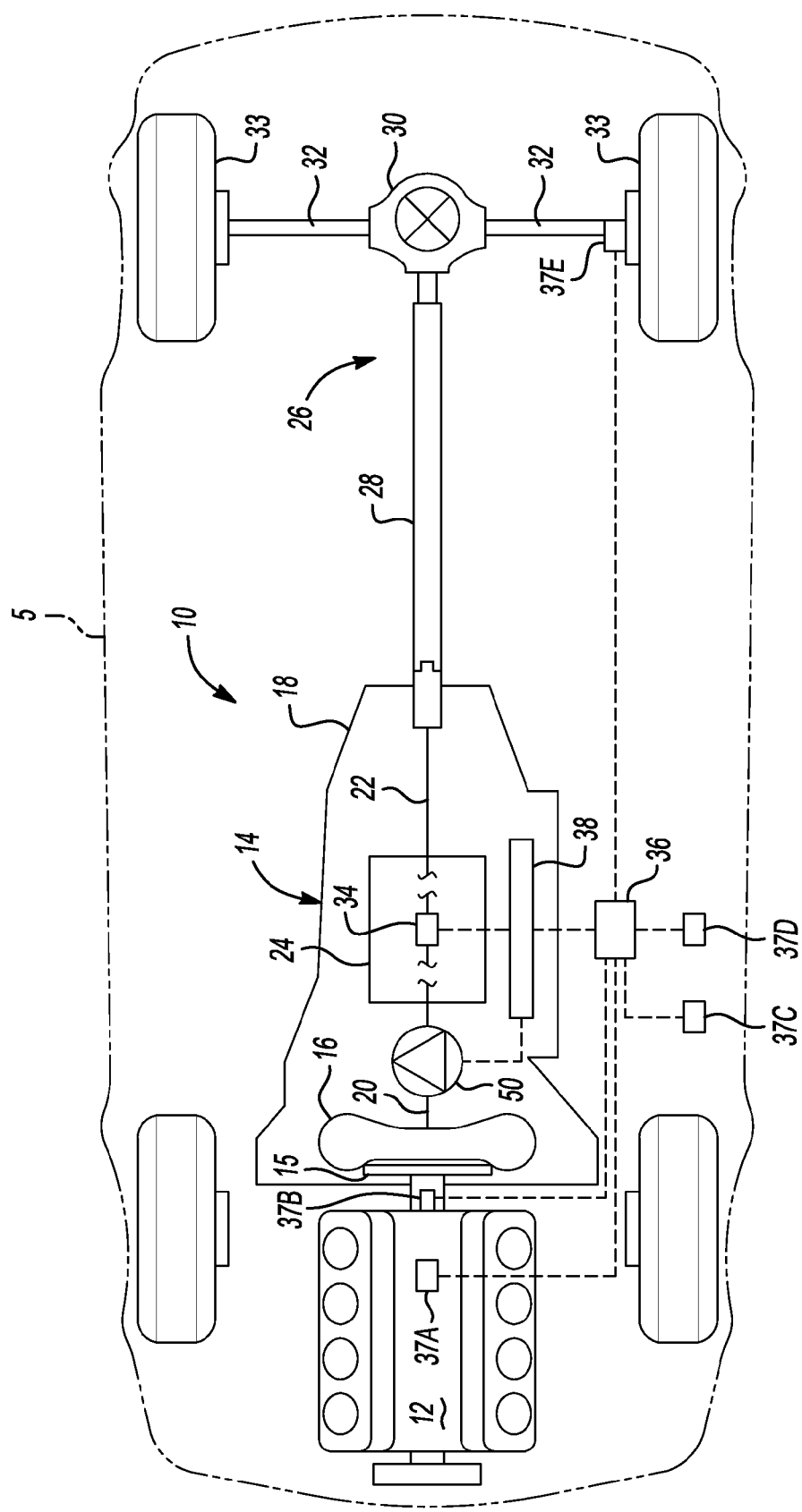
FIG. 1 is a schematic diagram of an exemplary powertrain in a motor vehicle according to the principles of the present invention.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric motor, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet or dry clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more electronic control devices having a pre-programmed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Figure 2:
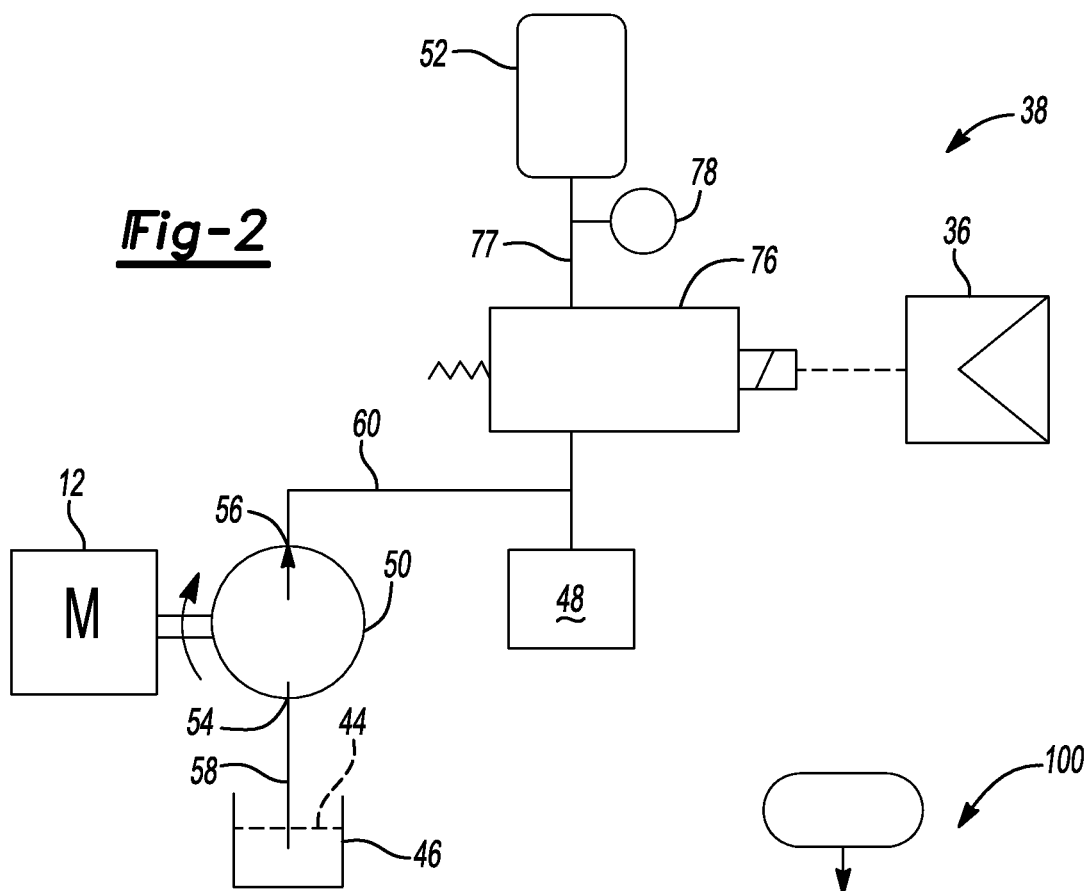
FIG. 2 is a schematic diagram of a portion of an exemplary hydraulic control system in accordance with the principles of the present invention.

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44, such as automatic transmission fluid, from a sump 46 to a clutch actuation circuit 48. The clutch actuation circuit 48 includes clutch control solenoids, valves, and actuators operable to engage the plurality of clutches/brakes 34. The hydraulic fluid 44 is communicated to the clutch actuation circuit 48 under pressure from either an engine driven pump 50 or an accumulator 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a main line pressure circuit 60. The main line pressure circuit 60 may include various optional features including, for example, a spring biased blow-off safety valve, a pressure side filter, or a spring biased check valve.

The main line pressure circuit 60 communicates with the clutch actuation circuit 48 and a solenoid 76 or other control device. The solenoid 76 is in fluid communication with an accumulator supply line 77. The solenoid 76 is electrically controlled by the control module 36 and is operable to control the charge state of the accumulator 52. In some variations, when the solenoid 76 is open, the accumulator 52 may discharge and when the solenoid 76 is closed, the accumulator 52 may charge and remain charged. The solenoid 76 may be an on/off solenoid, a pressure control solenoid, or a flow control solenoid, by way of example. While the accumulator 52 is illustrated as being charged by the main line pressure circuit 60, it should be understood that the accumulator 52 could alternatively be filled by a different hydraulic circuit, without falling beyond the spirit and scope of the present invention.

The solenoid 76 communicates with the accumulator 52 and a pressure sensor or estimator 78. In other words, element 78 may include a pressure sensor and/or an accumulator pressure or volume estimation algorithm. The accumulator 52 is an energy storage device in which the non-compressible hydraulic fluid 44 is held under pressure by an external source. The accumulator 52 includes a piston that has a seal that slides along a bore of the accumulator housing. On one side of the piston there is hydraulic fluid 44 and on the other side of the piston there is one or more springs and/or air. The accumulator 52 uses a combination of spring(s) and air to generate the force on one side of the piston that reacts against the hydraulic fluid pressure on the opposite side of the piston. An example of an accumulator for use with the present invention is disclosed in commonly assigned U.S. patent application Ser. No. 12/635,587 filed Dec. 10, 2009, published as 2011-0139285 hereby incorporated by reference as if fully disclosed herein.

Accordingly, the accumulator 52 is operable to supply pressurized fluid 44 back to the hydraulic circuit 60. The accumulator 52, when charged, effectively replaces the pump 50 as the source of pressurized hydraulic fluid 44, thereby eliminating the need for the pump 50 to run continuously. The pressure sensor 78 reads the pressure of the hydraulic fluid 44 within the supply line 77 in real time and provides this data to the control module 36. In the alternative, or in addition, element 78 represents an accumulator pressure or volume estimation algorithm, such that instead of (or in addition to) measuring the accumulator pressure, the accumulator pressure or volume may be estimated. Other types of sensors, such as volume or position sensors, may also be included. In addition, the accumulator 52 may have other configurations, without falling beyond the spirit and scope of the present disclosure; for example, the accumulator 52 could be a gas-charged type.

Hydraulic fluid 44 is stored in the accumulator 52 at a set volume and pressure while the engine 12 is off. In some variations, while the solenoid 76 is off, hydraulic fluid 44 will remain in the accumulator 52 as there is no path for any hydraulic fluid 44 to bypass the solenoid 76, excluding the minute amount of leakage that weeps past the clearances in the parts of the solenoid valve. In this example, when the solenoid 76 is energized electrically, it opens.

The decision to energize the solenoid 76 may be determined based on an engine start command in order to have the clutches/brakes 34 ready for vehicle launch, or it may be based on a mixing command as will be described in more detail below. Energizing the solenoid 76 allows hydraulic fluid 44 to leave the accumulator 52, enter the solenoid 76, and flow into the main line pressure circuit 60 that feeds the clutch actuation circuit 48. The clutch actuation circuit 48 controls the pressure and flow rate to the clutches/brakes 34 to control clutch capacity during the engine start up event to eliminate torque bumps and increase the isolation of engine start up vibrations. Once pressure within the main line pressure circuit rises due to the activation of the pump 50, the solenoid 76 is closed electrically by turning off power to the solenoid 76. The accumulator 52 charge process can start over again to allow for another engine off event or a desired mixing, as described in more detail below.

When the motor vehicle 5 stops (i.e., at a red light for example), it may be desirable to shut off the engine 12 in order to improve fuel economy. However, during an automatic engine stop event, the engine 12 is shut down which cause a loss of hydraulic fluid 44 pressure in the transmission hydraulic circuit and clutches. In order to properly control the transmission 14 upon engine re-start and vehicle launch, transmission oil circuits are filled and clutches pre-staged before vehicle launch by discharging the accumulator 52. For example, when an auto start signal is commanded, the controller 36 energizes the solenoid 76 thereby discharging the accumulator 52 for a period of calibrated time. In addition, application of a brake pedal for a predefined period of time may also be used to initiate accumulator 52 discharge. An example of a method for determining when to discharge the accumulator 52 is disclosed in commonly assigned U.S. patent application Ser. No. 13/228,275 filed on Sep. 8, 2011, hereby incorporated by reference as if fully disclosed herein. The solenoid commands in the clutch actuation circuit 48 electrically set up the transmission 14 to engage clutches/brakes. In some variations, it is desirable to engage only a minimum number of clutches/brakes so that a minimum number of clutches/brakes need to be filled; in other variations, it may be desirable to engage more than a minimum number or any other combination. An example of selecting the minimum number of clutches/brakes is disclosed in commonly assigned U.S. patent application Ser. No. 13/228,664 filed Sep. 9, 2011, hereby incorporated by reference as if fully disclosed herein.

Figure 3:
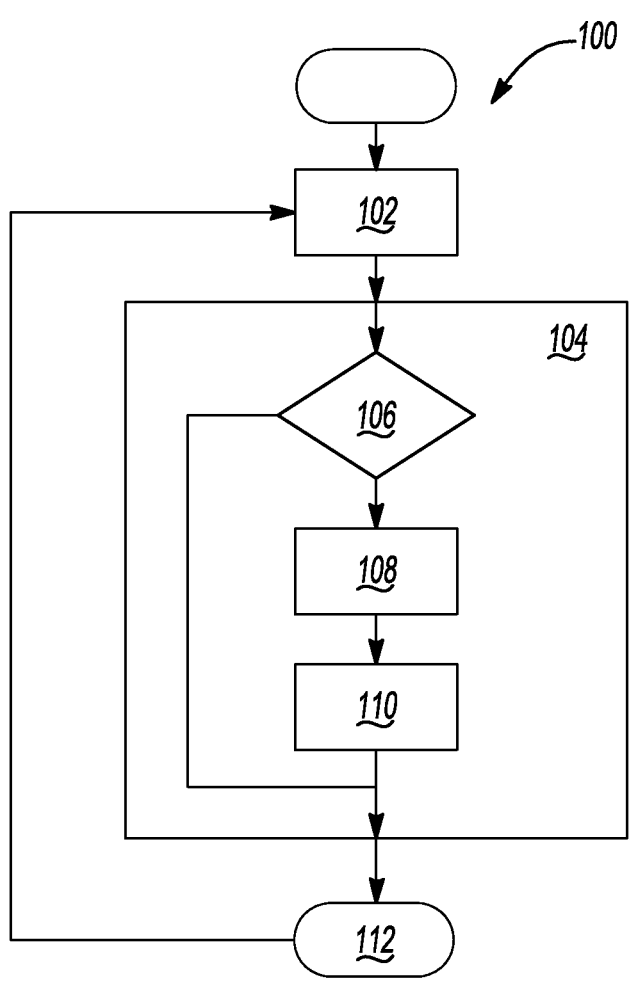
FIG. 3 is a block diagram illustrating a method of operating the motor vehicle of FIGS. 1-2 according to the principles of the present invention.

If the temperature of the hydraulic fluid 44 is too low, the automatic stop of the engine may be prohibited. With reference to FIG. 3, and with continued reference to FIGS. 1 and 2, a method 100 for operating the motor vehicle 5 and controlling the accumulator 52 will now be described. The method 100 is configured to exchange hydraulic fluid within the accumulator 52 and the transmission 14 when the hydraulic fluid within the accumulator 52 is colder than desired for starting the engine after an automatic engine stop. Accordingly, the method 100 results in mixing hydraulic fluid within the accumulator 52 with hydraulic fluid from the transmission 14 to maintain the temperature of hydraulic fluid within the accumulator 52 at a high enough temperature for the engine 12 stop/start to occur.

The method 100 includes an information-gathering step 102 of determining a set of accumulator temperature indicators. The accumulator temperature indicators may include ambient temperature of the air adjacent to the transmission 14 or accumulator 52, length of time since the last discharge (or charge) of the accumulator, current temperature of the hydraulic fluid within the transmission 14 and the main line pressure circuit 60, and temperature of the hydraulic fluid within the transmission 14 and the main line pressure circuit 60 at the time of the last discharge or charge of the accumulator 52, by way of example.

Accordingly, the information-gathering step 102 of determining the set of accumulator temperature indicators may include determining the length of time since a most recent charge or discharge of the accumulator 52 at a charging time. The information-gathering step 102 may additionally or alternatively include sensing an ambient air temperature adjacent to the powertrain, adjacent to the engine 12 or transmission 14, of the motor vehicle 5. Also, the information-gathering step 102 may additionally or alternatively include determining a charging temperature of hydraulic fluid within the transmission 14 or and/or main line pressure circuit 60 at the charging time, which is the time when the accumulator 52 was last discharged or charged. Furthermore, the information-gathering step 102 may additionally or alternatively include sensing a current temperature of hydraulic fluid within the transmission 14 and/or the main line pressure circuit 60 at a current time.

The hydraulic fluid may be sensed within the transmission 14 and/or main line pressure circuit 60 with a temperature sensor or other similar means, for example. The charging time temperature may be stored in the control module 36 or other controller or storage device, by way of example, and used by the control module 36 or other controller to determine when to discharge the accumulator 52 to mix the fluid in the accumulator 52 with the fluid of the transmission 14 and the main line pressure circuit 60. Other information may also or alternatively be gathered for use with the current method 100 and included as part of the set of accumulator temperature indicators used with the current method 100.

The method 100 includes a mixing step 104 of discharging the accumulator 52 as a function of the set of accumulator temperature indicators and subsequently charging the accumulator 52. The mixing step 104 may include discharging the accumulator 52 by opening the accumulator solenoid 76, as described above. In some forms, the mixing step 104 may include a sub-step 106 of determining a theoretical temperature variation index between hydraulic fluid located within the transmission 14 and hydraulic fluid located within the accumulator 52, wherein determining the theoretical temperature variation index is based on the ambient temperature, the length of time since the most recent charging of the accumulator at the charging time, the charging temperature of the charging time hydraulic fluid, and/or the current temperature of the current time hydraulic fluid, and/or any other desirable temperature indicators that are collected in the information-gathering step 102.

The method 100 includes a second sub-step 108 of discharging and the accumulator 52 if the theoretical temperature variation index exceeds a predetermined threshold. After the second sub-step 108 of discharging the accumulator 52 if the theoretical temperature variation index exceeds a predetermined threshold, the method includes a third sub-step 110 of charging the accumulator 52.

If in sub-step 106, the theoretical temperature variation index does not exceed a predetermined threshold, then the method 100 ends at step 112 and the second and third sub-steps 108, 110 are not executed. If, however, the temperature variation index does exceed a predetermined threshold, based on the accumulator temperature indicators, then the second and third sub-steps 108, 110 are executed, thereby discharging and charging the accumulator 52. After the accumulator 52 is discharged and charged in sub-steps 108 and 110, the method ends at step 112.

After the method ends at step 112, the method 100 repeats according to a predetermined schedule, going back to the information-gathering step 102. The method 100 could be repeated periodically or continuously, or with any other desired timing. For example, the method 100 could include discharging and charging the accumulator 52 multiple times to mix the fluid in the accumulator 52 with the fluid in the hydraulic circuit 60.

In some variations, the mixing step 104 of discharging the accumulator 52 as a function of the set of accumulator temperature indicators and subsequently charging the accumulator 52 may include implementing a schedule of commands to control the accumulator solenoid 76 and to change accumulator feed pressure within the powertrain system. It should be noted that in some cases, the accumulator feed pressure is line pressure. For example, a schedule of commands could be followed that is based on the accumulator temperature indicators to determine whether to discharge and subsequently charge the accumulator 52. For example, an offline table could be used to determine whether to discharge and charge the accumulator 52, based on the accumulator temperature indicators. A temperature estimation algorithm could be used to determine whether mixing (discharging/charging) should occur, based on the accumulator temperature indicators.

In some variations, the mixing step 104 of discharging and charging the accumulator as a function of the set of accumulator temperature indicators may include opening the solenoid 76 to discharge the accumulator 52 if the ambient temperature is below a predetermined temperature and the length of time since the charging time (time at which the accumulator 52 was last charged or discharged) is above a predetermined threshold.

The present disclosure also includes a powertrain system including a transmission, an engine, a hydraulic circuit, and accumulator, and a control module 36. These components have each been described above, and that description is incorporated by reference here. The control module 36 is configured to execute a first control logic to determine a set of accumulator temperature indicators, a second control logic to determine whether to discharge the accumulator as a function of the set of accumulator temperature indicators, and a third control logic to discharge the accumulator if the second control logic determines to discharge the accumulator.

Each control logic may follow portions of the method 100 described above. For example, the first control logic may include determining a length of time since a most recent charge or discharge of the accumulator 52 at a charging time, determining an ambient air temperature adjacent to the powertrain system, determining a charging temperature of the hydraulic fluid within the transmission 14 at the charging time, and determining a current temperature of the hydraulic fluid within the transmission 14 at a current time.

The second control logic may be configured to make a discharge determination, where the discharge determination is selected from a decision to discharge the accumulator and a decision not to discharge the accumulator. The discharge determination is based on the set of accumulator temperature indicators determined by the first control logic.

In addition, the powertrain system may include an accumulator solenoid 76 operable to open a solenoid valve. The third control logic may include opening the solenoid valve 76 to discharge the accumulator 52 if the second control logic selects the decision to discharge the accumulator as the discharge determination.

Similarly to the method 100, the powertrain system of the present disclosure may be configured wherein the third control logic include implementing a schedule of commands to control the accumulator solenoid 76 and line pressure within the hydraulic circuit 60. Likewise, the third control logic may include opening the solenoid valve 76 to discharge the accumulator if the ambient temperature is below a predetermined temperature and the length of time since the charging time is above a predetermined threshold.

The control module may be configured to execute a fourth control logic to determine a circuit pressure within the hydraulic circuit 60 and an accumulator pressure within the accumulator 52. The second control logic may be configured to make the discharge determination by selecting the decision to discharge the accumulator 52 if the accumulator pressure exceeds the circuit pressure.

Furthermore, the powertrain system of the present disclosure may include a control logic to be executed by the control module 36 to determine whether the engine 12 is off. The second control logic may be configured to select the decision not to discharge the accumulator 52 if the engine 12 is off.

Under certain air-to-fuel temperature ratios, engine torque loads, and/or transmission transient shifts, it may be desirable to ensure that the circuit pressure in the hydraulic circuit 60 is at its minimum prior to discharging the accumulator 52. Accordingly, the method 100 may include executing a fifth control logic to determine whether the circuit pressure is at its minimum, and if the circuit pressure is not at its minimum, executing a sixth control logic to change the circuit pressure to its minimum pressure prior to discharging the accumulator 52.

In some variations of the present method 100 and system, a temperature sensor may be omitted from the accumulator 52. In other words, the disclosed method 100 and/or system may be used to determine whether to mix accumulator hydraulic fluid with the transmission 14 and main pressure circuit line 60 hydraulic fluid. Accordingly, the method 100 may be accomplished without directly measuring the temperature of the hydraulic fluid in the accumulator 52 and without including a temperature sensor in the accumulator 52 or without including a temperature sensor that is configured to measure accumulator hydraulic fluid from the accumulator 52 or the accumulator supply line 77. In such a variation, a temperature sensor may be included in the transmission 14, but not in the accumulator 52 or the accumulator supply line 77 that is located outside of the transmission 14.

The description of the invention is merely exemplary in nature and variations that do not depart from the gist of the invention are intended to be within the scope of the invention. Such variations are not to be regarded as a departure from the spirit and scope of the invention. In addition, it should be understand that the system and method disclosed herein could incorporate various elements and features that are described throughout the present disclosure, as well as equivalents, without departing from the spirit and scope of the present invention.

The following is claimed:

1. A method for controlling an accumulator for use with a hydraulic circuit, the method comprising:
    determining a set of accumulator temperature indicators, wherein the step of determining the set of accumulator temperature indicators includes sensing an adjacent ambient air temperature and determining a length of time since a most recent charge or discharge of the accumulator at a charging time;
    discharging the accumulator as a function of the set of accumulator temperature indicators; and
    charging the accumulator after the step of discharging the accumulator.

2. The method of claim 1 wherein the step of determining the set of accumulator temperature indicators further includes determining a charging temperature of hydraulic fluid within the transmission at the charging time.

3. The method of claim 2 wherein the step of determining the set of accumulator temperature indicators further includes sensing a current temperature of hydraulic fluid within the transmission at a current time.

4. The method of claim 3 wherein the hydraulic circuit communicates with a powertrain of a motor vehicle, the powertrain including an engine and a transmission, and wherein the step of determining the set of accumulator temperature indicators including sensing the adjacent ambient air temperature includes sensing the temperature of air adjacent to the powertrain of the motor vehicle.

5. The method of claim 4 wherein the step of discharging the accumulator as a function of the set of accumulator temperature indicators includes opening an accumulator solenoid.

6. The method of claim 5 wherein the step of discharging the accumulator as a function of the set of accumulator temperature indicators includes implementing a schedule of commands to control the accumulator solenoid and to change accumulator feed pressure within the powertrain.

7. The method of claim 5 wherein the step of discharging the accumulator as a function of the set of accumulator temperature indicators includes opening the solenoid to discharge the accumulator if the adjacent ambient air temperature is below a predetermined temperature and the length of time since the charging time is above a predetermined threshold.

8. A method for controlling an accumulator of a powertrain in a motor vehicle, the powertrain having an engine and a transmission, the method comprising:
    determining a length of time since a most recent discharge or charge of the accumulator at a charging time;
    sensing an ambient air temperature adjacent to the powertrain of the motor vehicle;
    determining a charging temperature of charging hydraulic fluid located within the transmission at the charging time;
    sensing a current temperature of current time hydraulic fluid located within the transmission at a current time;
    determining a theoretical temperature variation index between hydraulic fluid located within the transmission and hydraulic fluid located within the accumulator, wherein determining the theoretical temperature variation index is based on the ambient air temperature, the length of time since the most recent discharge or charge of the accumulator at the charging time, the charging temperature of the charging time hydraulic fluid, and the current temperature of the current time hydraulic fluid;
    discharging the accumulator if the theoretical temperature variation index exceeds a predetermined threshold; and
    charging the accumulator after discharging the accumulator.

9. The method of claim 8 wherein the step of discharging the accumulator if the theoretical temperature variation index exceeds a predetermined threshold includes opening an accumulator solenoid.

10. The method of claim 9 wherein the step of discharging the accumulator if the theoretical temperature variation index exceeds a predetermined threshold includes implementing a schedule of commands to control the accumulator solenoid and line pressure within the powertrain.

11. A powertrain system of a motor vehicle, the powertrain system comprising:
    a transmission having at least one torque transmitting device;
    an engine operable to supply torque to the transmission;
    a hydraulic circuit in fluid communication with the transmission, the hydraulic circuit containing hydraulic fluid;
    an accumulator in fluid communication with the hydraulic circuit and the transmission, the accumulator configured to provide a compressive force on the hydraulic fluid; and
    a control module in communication with the transmission, the control module being configured to:
    execute a first control logic to determine a set of accumulator temperature indicators, including determining an adjacent ambient air temperature and determining a length of time since a most recent charge or discharge of the accumulator at a charging time;
    execute a second control logic to make a discharge determination, the discharge determination being selected from a decision to discharge the accumulator and a decision not to discharge the accumulator, the discharge determination being based on the set of accumulator temperature indicators; and execute a third control logic to discharge the accumulator if the discharge determination is selected as the decision to discharge the accumulator.

12. The powertrain system of claim 11 wherein the first control logic further includes determining a charging temperature of the hydraulic fluid within the transmission at the charging time.

13. The powertrain system of claim 12 wherein the first control logic includes determining a current temperature of the hydraulic fluid within the transmission at a current time.

14. The powertrain system of claim 12 further comprising an accumulator solenoid operable to open a solenoid valve, the third control logic including opening the solenoid valve to discharge the accumulator if the discharge determination is selected as the decision to discharge the accumulator.

15. The powertrain system of claim 14 wherein the third control logic includes implementing a schedule of commands to control the accumulator solenoid and to change accumulator feed pressure within the hydraulic circuit.

16. The powertrain system of claim 14 wherein the third control logic includes opening the solenoid valve to discharge the accumulator if the ambient temperature is below a predetermined temperature and the length of time since the charging time is above a predetermined threshold.

17. The powertrain system of claim 16, wherein the control module is configured to execute a fourth control logic to determine a circuit pressure within the hydraulic circuit and an accumulator pressure within the accumulator, the second control logic being configured to make the discharge determination by selecting the decision to discharge the accumulator if the accumulator pressure exceeds the circuit pressure.

18. The powertrain system of claim 17, further comprising executing a fifth control logic to determine whether the circuit pressure is at its minimum, and if the circuit pressure is not at its minimum, executing a sixth control to change the circuit pressure to its minimum prior to discharging the accumulator.

19. The powertrain system of claim 16, wherein the third control logic includes opening the solenoid valve to discharge the accumulator multiple times.

* * * * *